(12) United States Patent
Ashur et al.

(10) Patent No.: US 12,679,570 B1
(45) Date of Patent: Jul. 14, 2026

(54) DUAL GPS MODULE

(71) Applicant: Lucid Drone Technologies, Inc., Charlotte, NC (US)

(72) Inventors: Andrew Ashur, Huntersville, NC (US); Robert Blank, Charlotte, NC (US); Jeremy Allen, Monroe, NC (US); Thomas Ostrowski, Matthews, NC (US)

(73) Assignee: Lucid Drone Technologies, Inc., Charlotte, NC (US)

( * ) Notice: Subject to any disclaimer, the term of this patent is extended or adjusted under 35 U.S.C. 154(b) by 153 days.

(21) Appl. No.: 18/628,244

(22) Filed: Apr. 5, 2024

Related U.S. Application Data

(60) Provisional application No. 63/494,447, filed on Apr. 5, 2023.

(51) Int. Cl.
| | |
|---|---|
| B64U 20/70 | (2023.01) |
| B64U 20/83 | (2023.01) |
| B64U 50/13 | (2023.01) |
| H01Q 1/28 | (2006.01) |

(52) U.S. Cl.
CPC ............ B64U 20/70 (2023.01); B64U 20/83 (2023.01); B64U 50/13 (2023.01); H01Q 1/28 (2013.01); *B64U 2201/104* (2023.01)

(58) Field of Classification Search
CPC ......... B64U 20/70; B64U 20/83; B64U 50/13
See application file for complete search history.

(56) References Cited

U.S. PATENT DOCUMENTS

| | | | | |
|---|---|---|---|---|
| 2018/0183496 A1* | 6/2018 | Gasnier | ................. | B64U 10/14 |
| 2018/0327091 A1* | 11/2018 | Burks | ................... | B64U 50/13 |

FOREIGN PATENT DOCUMENTS

| | | | | |
|---|---|---|---|---|
| KR | 20030085463 A | * 11/2003 | ............... | H05K 9/00 |
| WO | WO-2020232645 A1 | * 11/2020 | ........... | B64U 30/293 |

OTHER PUBLICATIONS

WO 2020232645 (Year: 2020).*
KR 20030085463 A (Year: 2003).*

* cited by examiner

*Primary Examiner* — Roy Rhee
(74) *Attorney, Agent, or Firm* — Sisson & Banyas, Attorneys at Law, LLC; Edwin A. Sisson

(57) ABSTRACT

A drone includes a drone center housing, a drone top, and a drone bottom. The drone also includes a plurality of arms, a first antenna, and a second antenna. The plurality of arms each extend from the drone center housing. Each arm of the plurality of arms has a motor/propeller set disposed at an arm distal end located opposite the drone center housing. The first antenna may be mounted to a first arm distal end of a first arm of the plurality of arms opposite a first motor/propeller set mounted at the first arm distal end of the first arm, and the second antenna may be mounted to a second arm distal end of a second arm of the plurality of arms opposite a second motor/propeller set mounted at the second arm distal end.

3 Claims, 12 Drawing Sheets

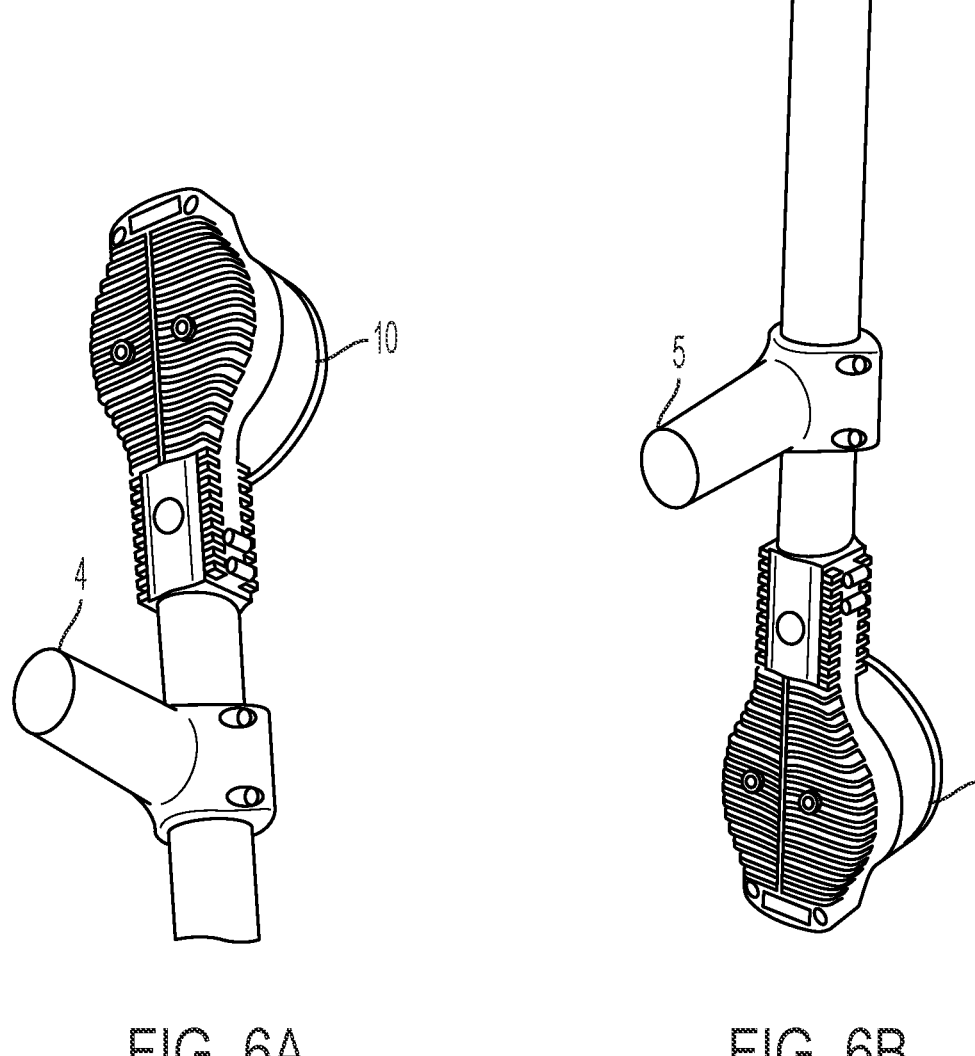
FIG. 6A                   FIG. 6B

DUAL GPS MODULE

BACKGROUND

Embodiments relate generally to positioning systems and, more particularly, to high accuracy heading determination.

An Unmanned Autonomous Vehicle (UAV), such as a robot used for commercial purposes, may have a control circuit, sensors, a communications system, and a navigation system such as a Global Navigation Satellite System (GNSS). The GNSS system includes satellites transmitting Global Positioning System (GPS) data. A drone is an example of unmanned aerial vehicle.

Although high accuracy may be obtained by GNSS receivers such as those onboard a UAV, problems occur in various scenarios where noise, interference, and other environmental effects result in inaccuracies. Such problems may occur due to interference or noise within a receiver, obstacles in or near a direct signal path that effect an electromagnetic wave or spectral shape, variation in frequency components of signals caused by transmission through different media, changes in signal gain or signal power, changes or alterations in system components including antennas and high frequency electronics and connectors, proximity to sources of interference such as external antennas or electrical noise, environmental conditions such as heat and humidity, receiver proximity to ancillary structures and equipment, multipath interference resulting from signals being reflected by various surfaces and thereby arriving at the receiver at slightly different times and strengths, and other reasons. Since GPS satellites are approximately 12,000 miles from GNSS receivers, GPS signals are subject to a large number of variables that effect transmission and increase attitude determination errors. For example, geomagnetic storms may cause timing delays, and Earth's non-uniform gravitational field causes relativistic effects.

In order to provide improved positioning performance, a GNSS receiver may obtain additional location correction information by any of several ways. For example, a Differential GPS/GNSS (DGPS) configuration assumes that any two proximate GNSS receivers will experience the same atmospheric errors. A first GNSS receiver's location is known, stationary, and conventionally referred to as a base location. A second or additional GNSS receiver is mobile and is known as a rover. Typically the first receiver calculates a difference between its known position and its calculated position based on signals received from GNSS satellites. Such difference is then used as an error correction factor that is transmitted to the rover for correcting the rover's location calculations.

DGPS accuracy may be improved in a GNSS receiver by implementing a Real-Time Kinematic (RTK) positioning method, thereby obtaining centimeter resolution. RTK may use carrier-based ranging, where range is calculated by determining the number of carrier cycles between a satellite and a roving receiver, and then multiplying the number of cycles by the carrier wavelength. Errors, such as clock and environmental errors, are mostly removed from the calculated range by on-board estimator algorithms comparing the calculations of base station and rover. Additional improvements may result, for example, by using a technique to identify carrier phase ambiguities, known generally as the LAMBDA (Least-squares AMBiguity Decorrelation Adjustment) method, and enhancements thereof. Redundant attitude estimation may be carried out in an error-state Kalman filter. Multipath correction may be performed in a GNSS receiver, such as by utilizing advanced processing algorithms based on reception timestamps. Additional data may be obtained from sensors or instruments such as a compass or gyroscope/accelerometer. For achieving improved quality metrics related to the received signals, the use of estimates and confidence models, networking a number of transceivers having known positions, and other methods and apparatus are known.

Although conventional methods such as differential error correction typically achieves high accuracy, a loss of precision may still result from latency, noise, interference, effects of distance between base and rover, differences in reception, differences in environmental effects, and related factors.

Embodiments of the present disclosure describe apparatus and systems for obtaining improved high accuracy heading control.

BRIEF DESCRIPTION OF DRAWING FIGURES

Advantages of the disclosure may be better understood by those skilled in the art by reference to the accompanying figures in which:

FIGS. 6A and 6B are perspective views of antennas and motors at distal ends of drone arms in an exemplary embodiment;

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 4:
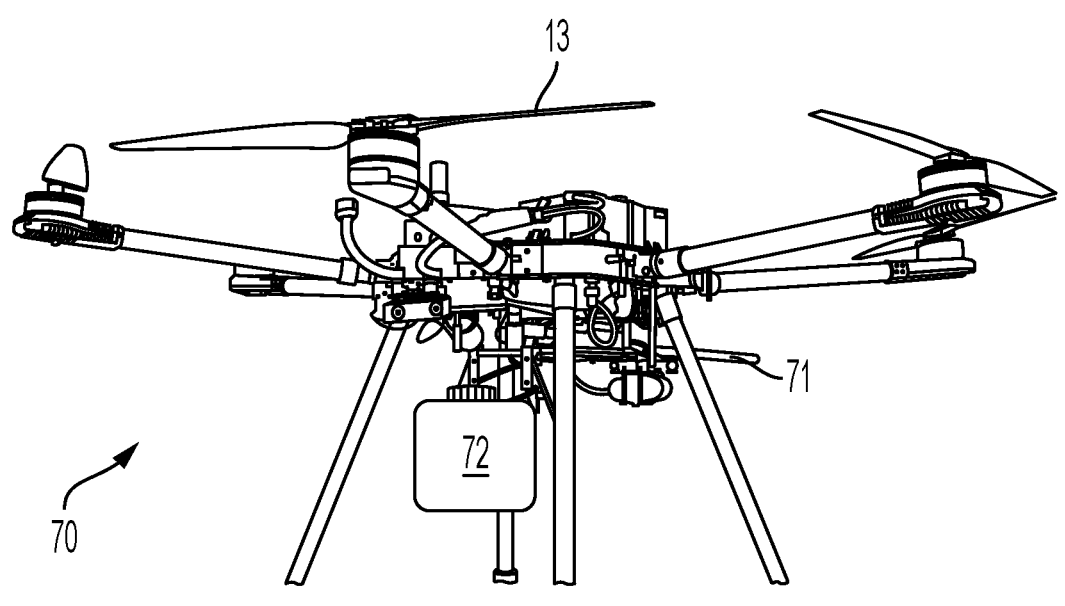
FIG. 4 is a perspective view of a commercial drone having ancillary load equipment.
Figure 5:
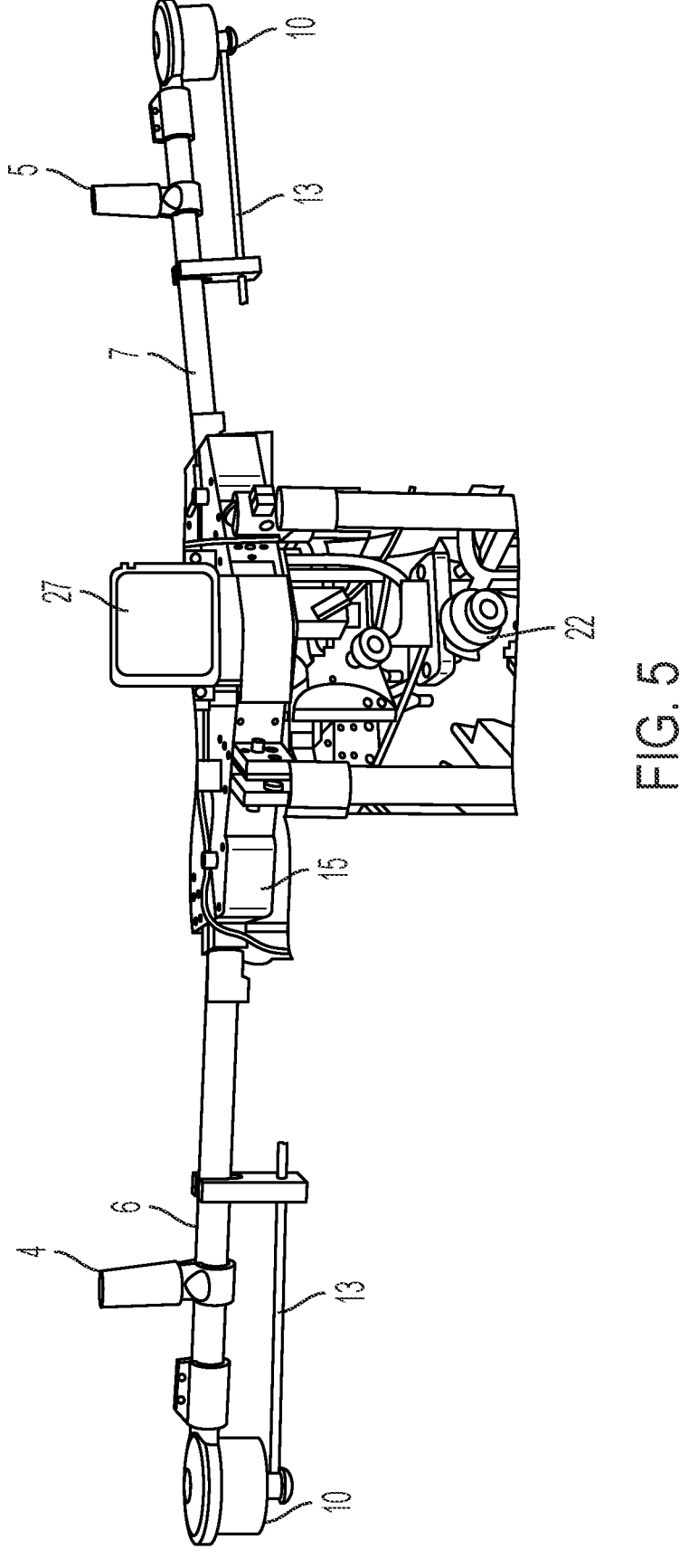
FIG. 5 is a perspective view of a drone in an exemplary embodiment.

An exemplary embodiment may include a commercial drone adapted to carry a payload that includes ancillary equipment for performing operations such as, for example, cleaning the exterior of a building by dispensing a liquid, such as a cleaning solution. Such buildings may include multistory residential homes, commercial, educational, athletic, governmental, and institutional structures including skyscrapers, halls, gymnasiums, and monuments. An exemplary commercial drone 70 adapted for performing cleaning operations is shown in FIG. 4. The payload may include a wand/gun 71 of a power washer or pressure washer, and a fluid tank 72 attached to the bottom of the drone. The use of one or more drones is a much safer and efficient way to perform tasks that were previously difficult or dangerous. With regard to cleaning, and specifically the cleaning of multistoried building exteriors, dangerous, inefficient, and expensive equipment generally is conventionally required. In eliminating the use of ladders, lifts, scaffolds, and other related equipment, liability concerns and many accidents and deaths are prevented. Although the speed and efficiency of drone usage have effected tremendous improvements in safety and productivity for such operations, the inventors have achieved improvements in drone performance.

In particular, conventional drones typically use a compass/magnetometer, alone or as part of an Inertial Measurement Unit (IMU) for determining heading information. However, when attempting to fly a drone in close proximity to a large building, the operation of a compass is adversely effected by the ferrous steel materials of the building, whereby significant errors create non-linear deviation in heading information. Magnetic fields that effect a compass may also be created by high-current electrical conductors, motors, and other sources that may be encountered by a commercial drone, especially when flying at high speed or when making continual flight adjustments. Although a compass may incorporate methods and apparatus to compensate for some magnetic drift, such compensation may only reduce the deviation and may introduce delay or latency in providing heading information. For the precision required for a commercial drone flying in proximity to magnetic fields and ferrous materials, a conventional compass is insufficient for providing and/or correcting heading information. For example, if the heading of a drone is inaccurate by even one or two degrees, a cleaning operation being performed may result in portions of a building not being fully cleaned because a spray head is incorrectly aimed. In addition, effects of latency are magnified in a system, for example, where it is desirable to increase the speed of operations. Effects of carrying a heavy and/or unbalanced payload, for example including industrial cleaning sprayers and tanks, may create additional challenges in providing integrated, real-time multi-source heading information.

An exemplary embodiment is shown in FIGS. 1-13 and includes a system 1 having a commercial drone 2 configured for reception of positioning signals from a constellation 3 of satellites in defined orbits, such as the Global Positioning System (GPS). The GPS satellites continuously transmit microwave L-band radio signals in two frequency bands, centered at 1575.42 MHz and 1227.6 MHz, denoted as L1 and L2 respectively, to permit corrections for ionospheric delays in propagation. The signals can be modulated with a precision (P) PseudoRandom Noise (PRN) code and a Civilian Access (C/A) pseudorandom noise code in phase quadrature and transmitted as circularly-polarized signals that include timing patterns relative to a satellite's onboard precision clock. The codes allow identification of the satellites and measurement of the transit times.

Figure 1:
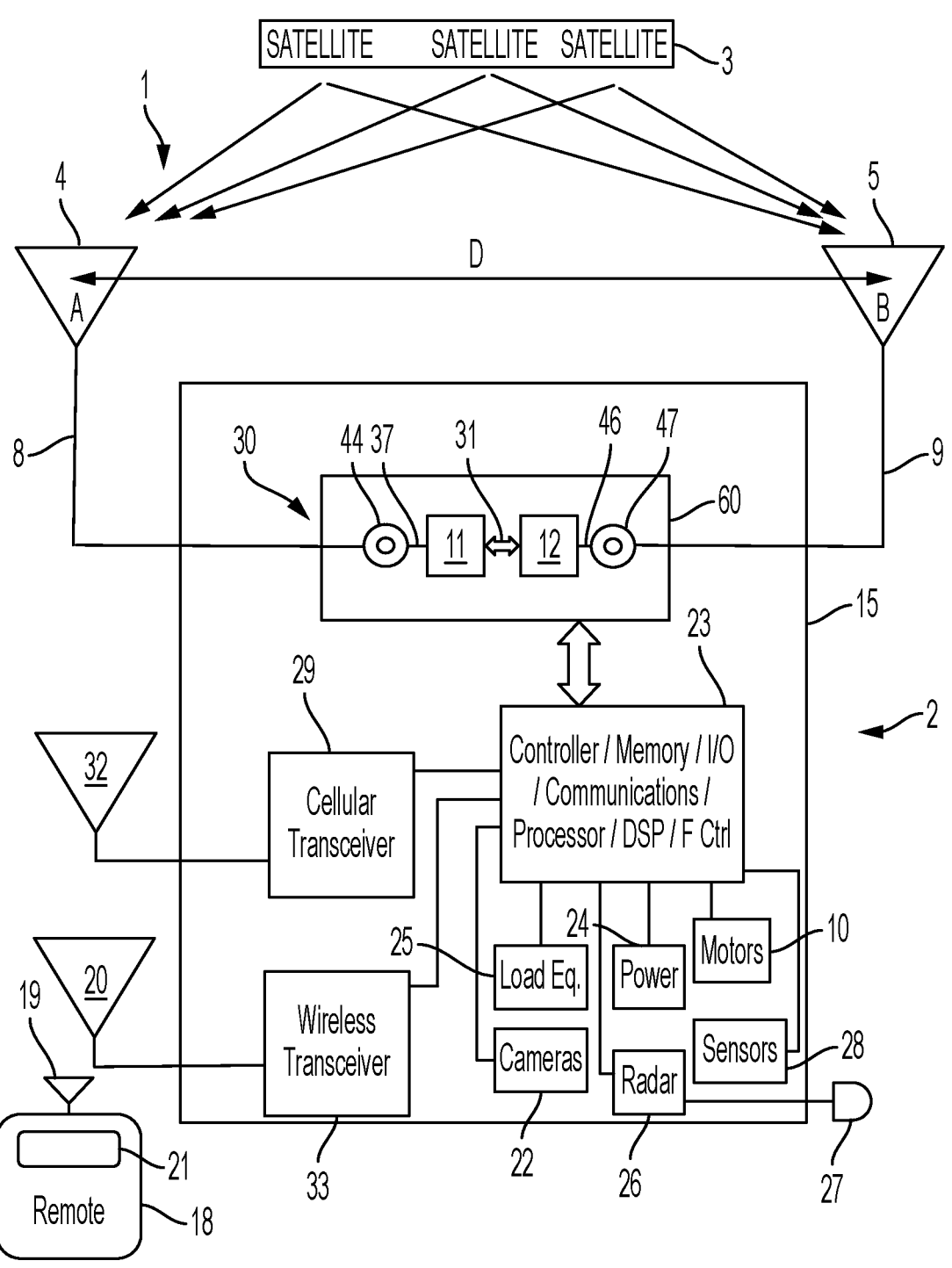
FIG. 1 is a schematic diagram of a drone in an exemplary embodiment.
Figure 2:
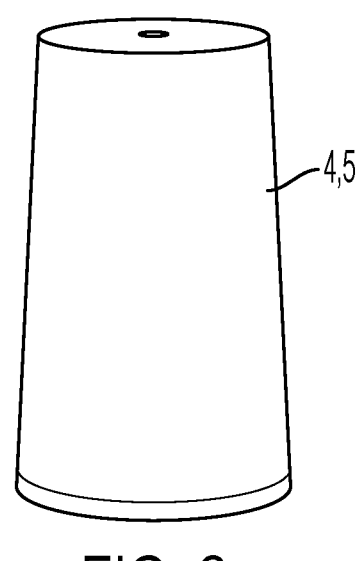
FIG. 2 is a perspective view of a helical antenna used in an exemplary embodiment.
Figure 3:
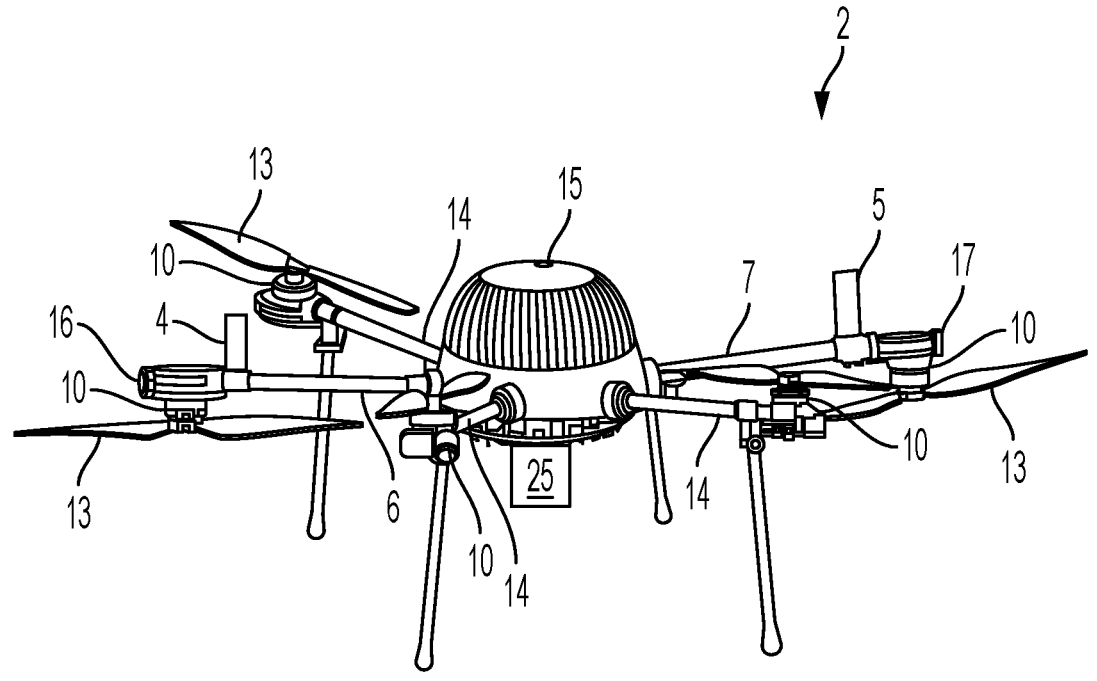
FIG. 3 is a perspective view of a drone in an exemplary embodiment.

Commercial drone 2 receives the GPS signals at a first GNSS antenna 4 and at a second GNSS antenna 5. FIG. 2 shows an exemplary antenna 4, 5 that is a dual-band helical antenna designed for precise positioning, covering the L1/L2 GNSS frequency bands. Such antennas are available from the Tallysman company of Ottawa, Canada. Antennas 4, 5 may each weigh approximately 30 g and contain an integrated Low Noise Amplifier (LNA) which includes a low-loss pre-filter that prevents harmonic interference from high amplitude signals and cellular signals. The LNA boosts the signal with a gain of 35 to 40 dB. LNAs are powered by Direct Current (DC) voltage supplied through coaxial cable connections, described below. The gain provided by the LNAs remediates any attenuation of signals caused by insertion losses of connectors and cabling. In an embodiment, antennas 4, 5 are packaged in protective covers having a tapered cylindrical form, and include a SubMiniature version A (SMA) type connector (not shown). Antennas 4, 5 may also be configured for reception of the Glonass G1/G2, Beidou B1/B2/B3, and Galileo E1/E5B bands. Other antennas may be used, and are preferably active, multi-frequency, high accuracy antennas that provide polarization purity in a compact form factor. Positioning of antennas 4, 5 is important because they receive satellite signals from above. As discussed herein, antennas 4, 5 may be positioned on top of diagonally opposed arms 6, 7. Cables 8, 9, are respectively fed inside arms 6, 7 to receivers 11, 12. Regardless of the arm orientation, the antenna should be placed so that an imaginary antenna line from the vertical top to bottom line passing through the center of each antenna also passes through the vertical top to bottom line passing through the center of the drone center housing. For balance purposes, each antenna should be approximately equidistant from the drone center housing and the angle formed by a first imaginary line running from the drone center housing to the first antenna and a second imaginary line running from the drone center housing to the second antenna is approximately 180 degrees.

Drone 2 also includes a plurality of arms with motors 10 with attached propellers 13 forming a motor/propellor set. Each arm of the plurality of arms has an arm distal end opposite the arm end located at the drone center housing. These motor/propeller sets are each disposed at the distal ends of arms 14 which extend from a drone center housing 15. For reference, the drone will have a drone top opposite a drone bottom. In an embodiment, antennas 4, 5 are attached to top surfaces of diagonally opposed arms 6, 7, with arm 6 being the first arm and arm 7 being the second arm of the plurality and corresponding motors 10 and propellers 13 of first and second arms 6, 7 are flipped to the bottom side of the drone, whereby antennas 4, 5 are mounted to the first arms near the first arm distal end 16, and the second arm distal end, 17 so as to avoid being hit by blades of propellers 13. As mentioned earlier the arms having the antennas on the top side are diagonally opposed relative to the center housing so as to maintain balance. The remainder of motors 10 and propellers 13 are positioned on the drone top sides of other arms 14. As a result of such configuration, drone 2 has a reduced amount of in-flight vibration compared with conventional placement of all motors 10 and propellers 13 on the top sides. Although drone 2 is shown with six single arms 6, 7, 14, embodiments may alternatively include any number of arms having any shape. For example, an arm may have a "Y" shape with two motors per arm.

Drone 2 may be flown by being manually operated by a human using a remote control device 18 that communicates with drone 2 in a wireless platform, for example a Visual Line of Sight (VLOS) configuration including radio signals exchanged via antenna 19 of remote control device 18 and antenna 20 of drone 2. Enhanced performance/functionality of such communication may be achieved, for example, by using Beyond VLOS (BVLOS), and the like. RC device 18 may include at least one display 21, whereby a user is able to fly the drone by manipulating various controls, such as one or more joysticks, while watching a video feed being sent from drone 2. Such video may include selectable views from multiple on-board cameras 22.

RC device 18 includes at least one processor implementing flight control programs that communicate with on-board controller 23, and human interface controls (not shown) such as joysticks, go-home button, etc. Drones may be partially or fully autonomous, whereby various operations are automated. For example, a return-to-base operation may automatically occur when controller 23 determines a drone has a low battery, is out of range, etc. Controller 23 is configured to dynamically access instruction sets, or modules, for implementing its many functions. Such modules may be formatted to include routines and configurations that may be updated at various levels, such as in firmware updates, for exchange of operational data, for refreshing or resetting status or alarm status, for updating fields with current data, etc.

Controller 23 includes at least one processor, memory, input/output capabilities, Digital Signal Processor (DSP) devices, and at least one analog and/or at least one digital component configured for flying drone 2. Such configurations may include, but are not limited to, movement control, steering control, motor control, acceleration control, communicating signals and data, calculating, interfacing, and others known to those skilled in the art. Controller 23 is coupled to a plurality of motors 10 via a motor control circuit (not shown), to a drone main power supply 24 that includes one or more batteries (not shown), to a one or more cameras 22, to ancillary load equipment 25 that may include its own drivers and control circuitry, to a radar device 26 that includes a front-facing detector 27, and to a variety of types of instruments/sensors 28 that may include thermal, Light Detection and Ranging (LIDAR), accelerometer, gyroscope, magnetometer, barometer, tilt, inertial measurement unit, engine intake flow, current, image, and others. Controller 23 is also coupled to a dual GPS module 30 that provides at least heading data.

[X] Dual GPS module 30 includes a first GNSS receiver 11 and a second GNSS receiver 12, with a data communication connection 31 connecting a Transmission (TX) output of receiver 11 to a Reception (RX) input of receiver 12 and connecting a reception RX input of receiver 11 to a transmission TX output of receiver 12. When the flight control of drone 2 is performed by a user operating remote control device 18, communications connection 31 may provide primary correction of heading data being used to adjust yaw of drone 2, such as when being directed at the face of a building being cleaned. Such communications may be referred to herein as a base-to-rover type Universal Asynchronous Receiver-Transmitter (UART) communications that transfer data in various serial formats. For example, information fields may use different amounts of bytes within a message, according to any of various protocols used for processing GPS data, and according to a message type. For example, Radio Technology Commission for Maritime Services (RTCM) correction data may be output by one receiver acting as a base and may be received by the other receiver acting as a rover, and Secure Position Augmentation for Real Time (SPARTN) correction data may be received via the L-band satellite signals. UART data communications allow for various configurable data formats and transmission speeds. Various configuration options provide selectable filtering for dual GNSS operation. Multiple messages may be exchanged for each heading fix, and fields may be extended to include more numbers and achieve greater resolution per message, whereby heading accuracy is maximized. In an embodiment where functionality of module 30 is limited to providing and correcting heading data, when receiver 11 acts as a base and only outputs a selected limited number of messages, this reduces the output load for each navigation period and, when combined with selection of a baud rate that is maximized while being sufficient to sustain error-free data transfer for the selected navigation rate and number of GNSS messages being received, accuracy, efficiency, and consistency of heading control are maximized. By implementing base and rover receivers adjacent one another, and by using a module 30, to preferably thoroughly shield the circuit board, and associated signals from antennas 4, 5, discussed further below, latency and noise problems are eliminated.

Figure 7A:
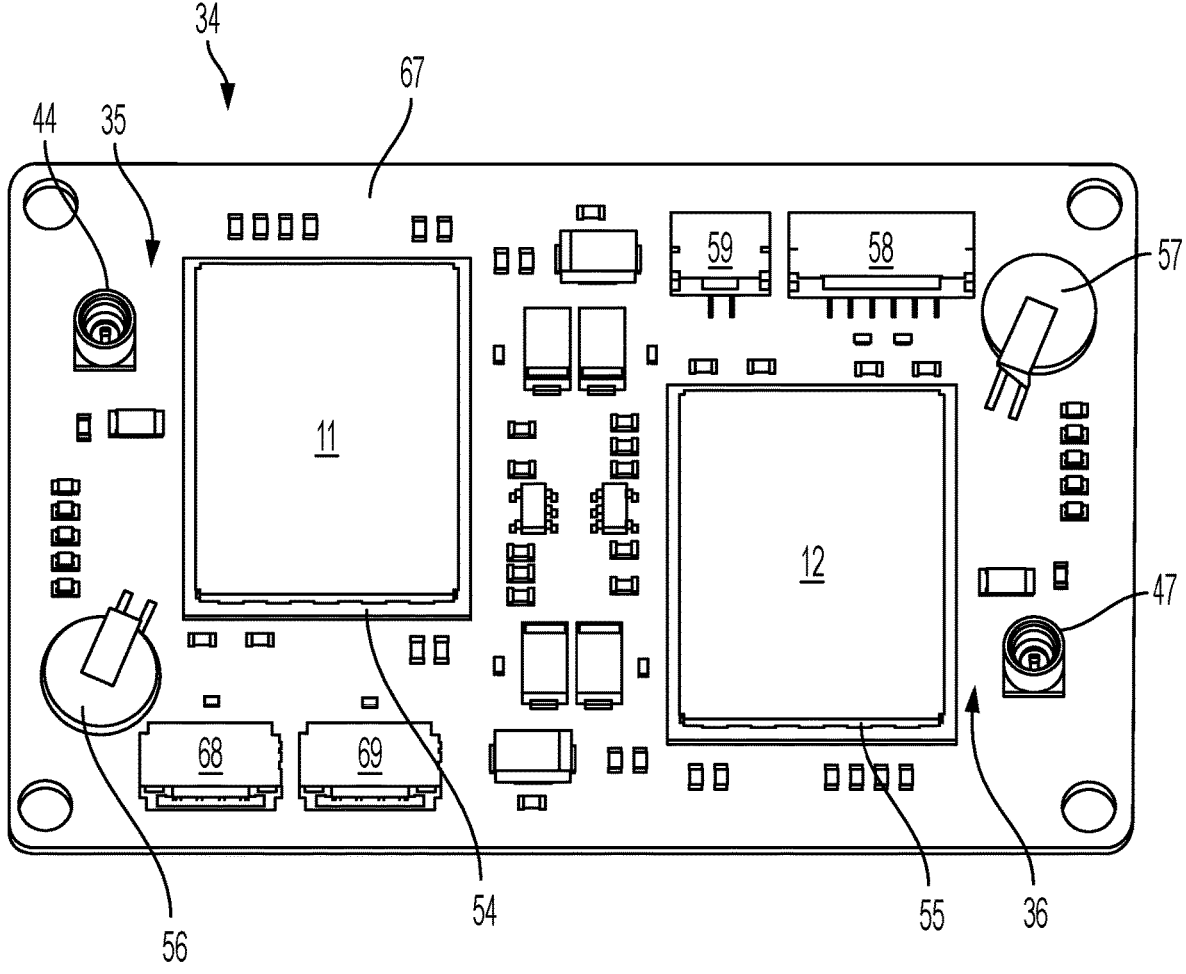
FIGS. 7A and 7B are respective perspective views of the top side and bottom side of a dual GPS circuit board in an exemplary embodiment.
Figure 7B:
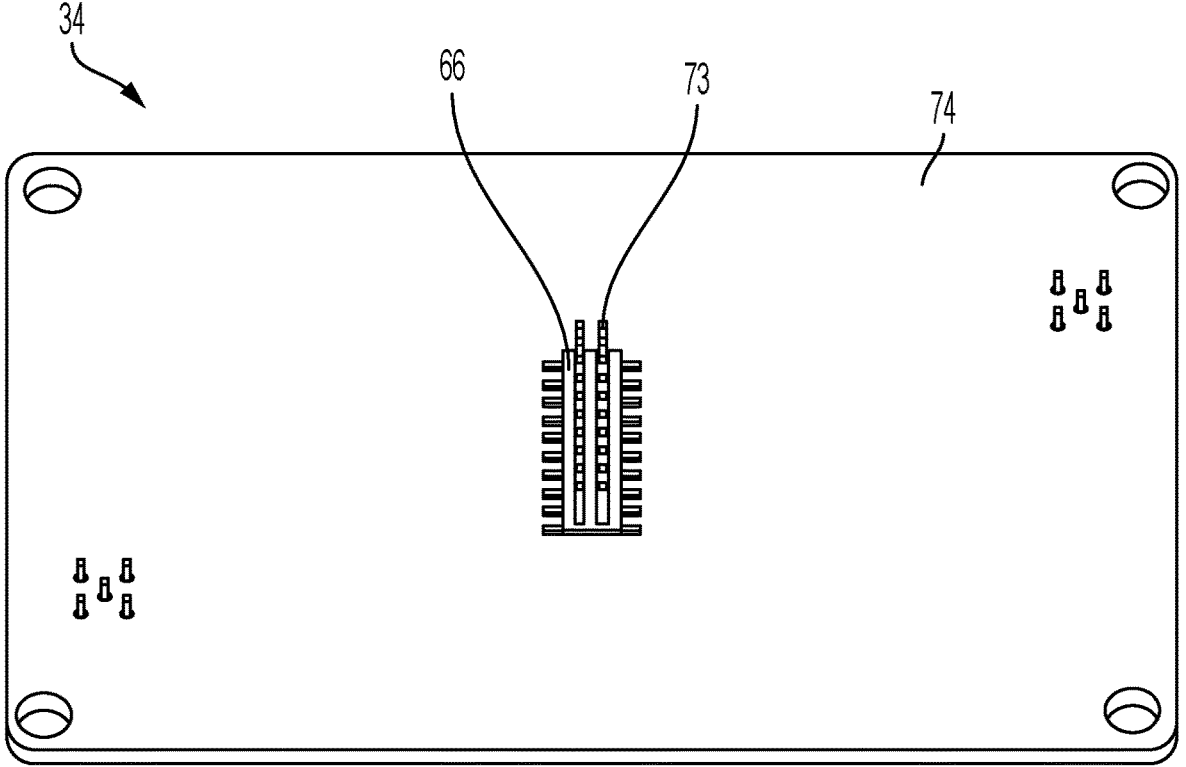
Figure 8:
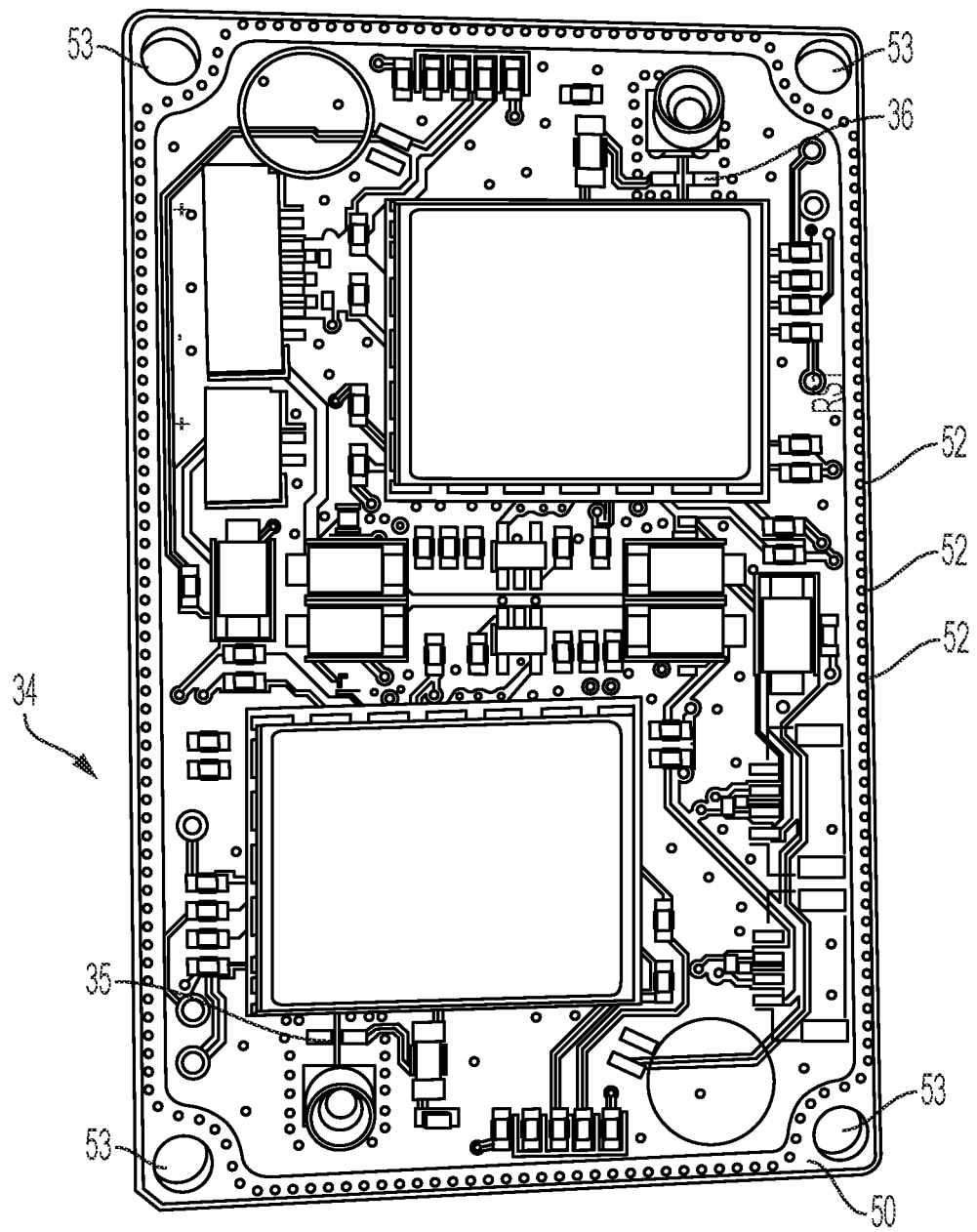
FIG. 8 is a perspective view of a dual GPS circuit board in an exemplary embodiment.
Figure 9:
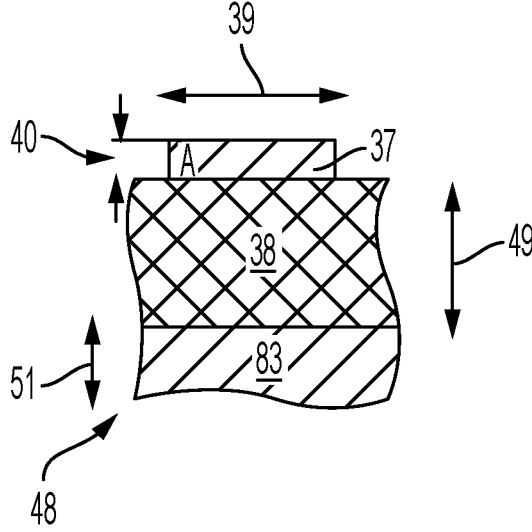
FIG. 9 is an elevation view of a multilayer circuit structure.
Figure 10:
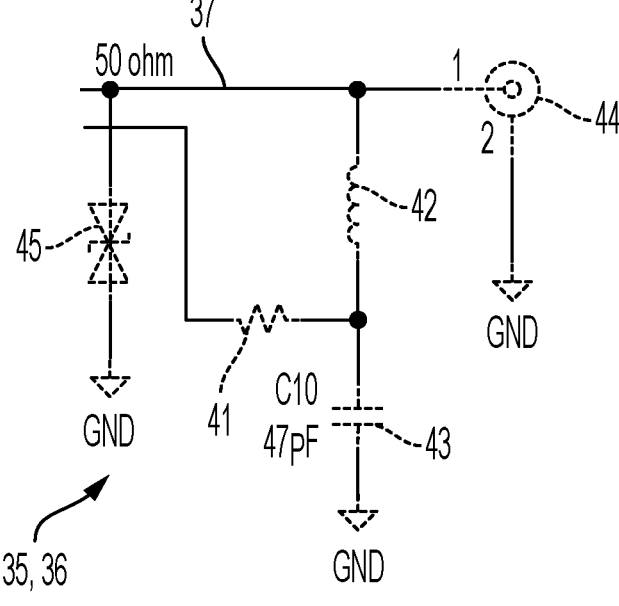
FIG. 10 is a schematic of an antenna reception circuit in an exemplary embodiment.
Figures 11A, 11B:
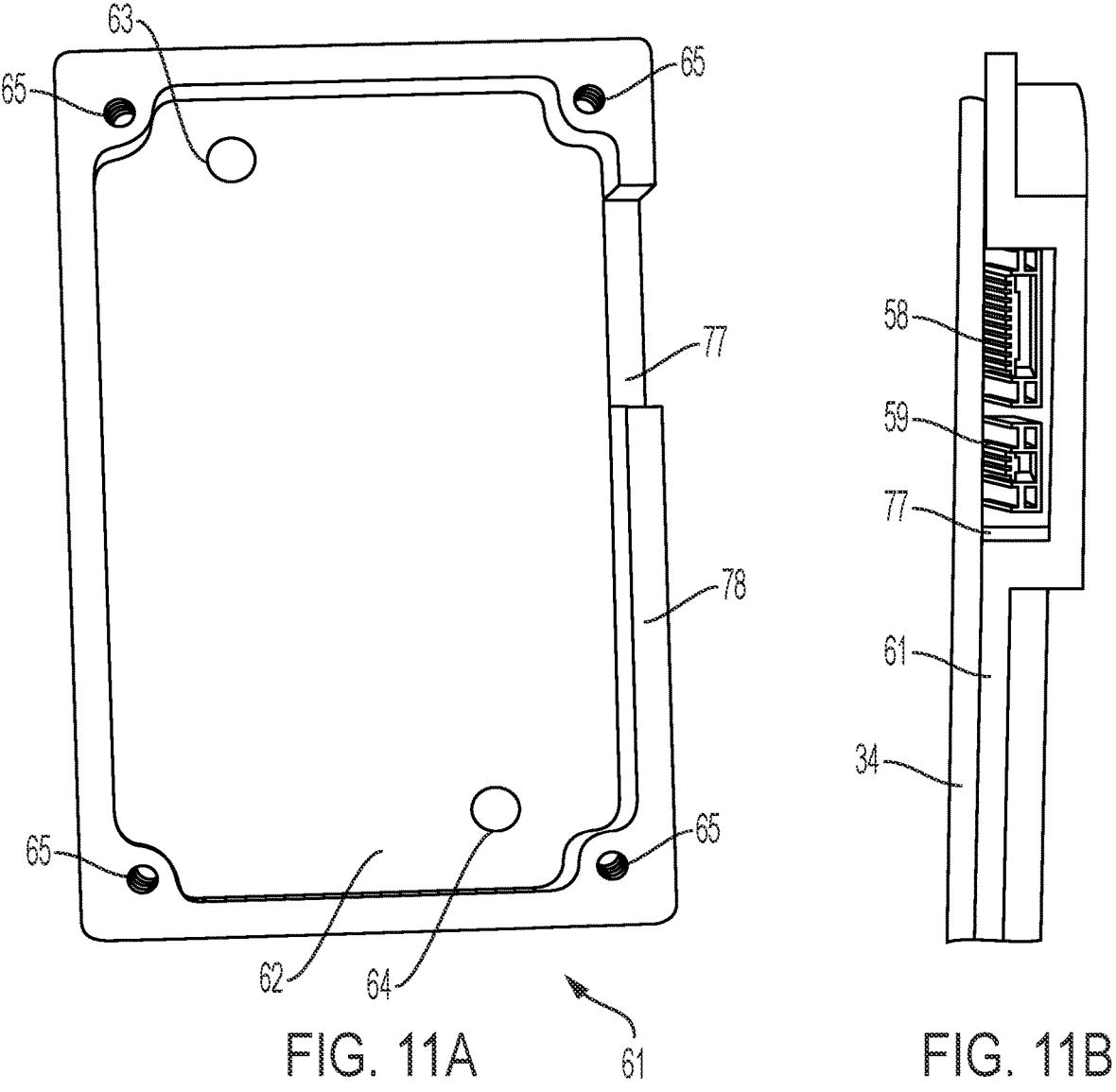
FIGS. 11A and 11B are perspective views of a bottom section of a shield enclosure in an exemplary embodiment.
Figure 12:
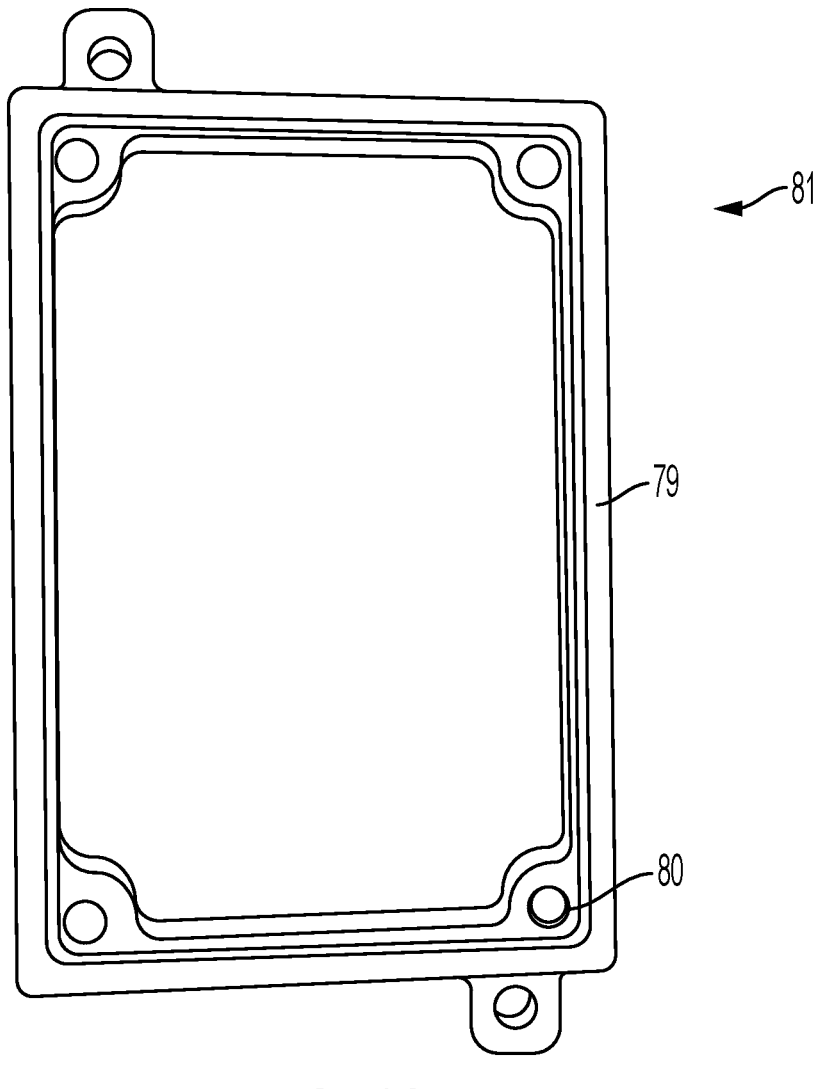
FIG. 12 is a perspective view of a top section of a shield enclosure in an exemplary embodiment.

In the following description, a GPS signal reception circuit is described for first GNSS receiver 11, and such description is equally applicable to GPS signal reception for second GNSS receiver 12. FIGS. 7A, 7B, and 8 are perspective views of a loaded circuit board 34 of an embodiment of dual GPS module 30. FIG. 10 is a schematic diagram of an exemplary tuned microstrip circuit 35, 36, and FIG. 9 is a cross-sectional view of a microstrip trace 37 formed as a copper layer A disposed on a dielectric substrate 38 of circuit board 34. Trace 37 has a width 39 and a height 40. Circuit board 34 will have a circuit board top side, opposite a circuit board bottom side. Circuit board 34 may include one or more ground planes, such as on a bottom side and formed to shield trace 37 or change a characteristic impedance, but such are required to have a high precision. In such a case, an optional ground plane may be formed within one or more internal layers (not shown) of substrate 38 or as a bottom layer C. A Resistance, Inductor and Capacitor (RLC) filter is formed of resistor 41, inductor 42, and capacitor 43, chosen to propagate the L1/L2 frequencies along trace 37 to meet desired reception performance criteria. In an embodiment, such may affect a tuned microstrip. Although one RLC filter is shown, any number of microstrip filter elements may be employed. Trace 37 directly connects an RF input of GNSS receiver 11 to GPS antenna connector 44, and is biased by a voltage maintained within limits by a Zener diode 45. Regarding GNSS receiver 12 and associated microstrip portion 36, Trace 46 directly connects an RF input of GNSS receiver 12 to GPS antenna connector 44, and is biased by a DC voltage. Such DC voltage is supplied to antennas 4, 5 via respective coaxial cables that carry the GPS signals via connectors 8, 9.

Circuit board 34 may be formed using a standard FR-4 type PCB substrate. Alternatively, reduced dielectric losses, especially at microwave frequencies, may be obtained using an alumina substrate, which typically provides a more consistent dielectric constant. This is especially so when circuit board 34 is adapted when high reception accuracy is required, such as when an embodiment includes microstrips/ traces having a long length, having an embedded or underlying ground plane, and/or having different conductor thicknesses. A microstrip copper trace 37 has a characteristic impedance that depends on the frequency of signals being carried, and since impedance varies over the cross section of trace 37, dimensions are held within a tolerance that assures signals are not attenuated or modified, within a chosen tolerance. As shown by example in FIG. 9, a circuit board 48 typically has a number of layers such as layers A, B, and C. In some embodiments, a stacked or layered structure may effect an integrated substrate for microstrip trace 37. For example, any of trace 37, a ground plane, dielectric, and insulator may be disposed in any of layers A, B, C. The height 49 of substrate layer B effects the characteristic impedance of microstrip sections 35, 36. The height 51 of optional layer C may include several different heights, depending, for example, on whether individual conductors or insulating layers are required in particular circuit locations. US Publications 2023X645 and 2019X432 illustrate examples of circuit construction methods and the teachings of which are incorporated herein in their entirety.

Antennas 4, 5 are typically connected to antenna connectors 44, 47 of module 30 with coaxial cables 8, 9 suitable for the L1/L2 frequency range, having a woven ground shield, and immune to ElectroMagnetic Interference (EMI). Cables 8, 9 each have an SMA type connector at each end, for mating with compatible SMA connectors 44, 47 and the connectors of antennas 4, 5. The DC bias voltage is provided to antennas 4, 5, such as for powering LNAs, along the same inner conductor of cables 8, 9 used for GPS signals being sent to receivers 11, 12. In an embodiment, a Surface Acoustic Wave (SAW) filter may be provided between respective antennas 4, 5 and antenna connectors 44, 47, although such may create delays in signal processing.

It is noted that conventional GNSS receivers may have problems with noise and interference as a result of microstrips' ability to propagate electromagnetic signals into the surrounding RF environment where such unwanted signals are unintentionally received and conducted by other circuits or networks operating in the same environment and thus interfere with these circuits as noise or interference signals.

With the simple configuration of circuit board 34 and module 30, conventional problems with noise or interference such as crosstalk are eliminated. Module 30 provides electromagnetic shielding of circuit board 34 with a shield enclosure 60, described further below, which eliminates both received and transmitted noise and interference. As shown in FIG. 8, circuit board 34 includes a perimeter ground pad 50 having periodically-spaced ground vias 52, and plated-through corner mounting holes 53 that provide abundant grounding by being securely fastened with metal connectors (not shown) to shield enclosure 60. Layout routing of trace 37, and placement and dimensions of optional ground layer 83 (FIG. 9) may be configured to further minimize noise or interference signals.

As shown by perspective view in FIGS. 7A and 7B, circuit board 34 includes GNSS receiver 11 mounted on a platform 54 on top surface 67, GNSS receiver 12 mounted on a platform 55, a battery 56 that maintains memory (e.g., battery backed-up RAM) in receiver 12, a battery 57 that maintains memory in receiver 12, signal/power connectors 58, 59, first and second universal serial bus (USB) connectors 68, 69, a first SNA type antenna connector 44, and a second SNA type antenna connector 47, first tuned microstrip circuit 35, and second tuned microstrip circuit 36. Platforms 75, 76 may include device sockets and/or conductive metal pads (not shown). Platforms 75, 76 may include internal routing of conductors, such as for adapting chosen receiver conductors to a chosen arrangement for connection to conductors of circuit board 34. For example, a chosen arrangement may be customized or be presented in a standard form used in circuit layout. Platforms 75, 76 may be integrally formed with respective receivers 11, 12, such as in an L GA type package with input/output and voltage pads located on the outside edge of four sides and with centrally located ground pads. An optional input/output connector 66 may be provided to extend signals to/from receivers 11, 12 outwardly from bottom surface 74 with conductor pins 73.

As shown in FIGS. 11A, 11B, 12, and 13, shield enclosure 60, alternatively, or alternatively enclosure shield 60, has a top housing member 61 with a recessed inner portion 62 having a first antenna connector hole 63 and a second antenna connector hole 64. Threaded corner holes 65 are located at the four corners of top housing member 61. A U-shaped opening 77 is formed to extend from planar mating surface 78, whereby an opening is provided to allow access to signal/power connectors 58, 59. When circuit board 34 is placed into top housing member 61, corner holes 53 of circuit board 34 align with corner holes 65. First and second antenna connectors 44, 47 of circuit board respectively extend through first and second antenna connector holes 63, 64 and may be directly grounded to top housing members 61, 64. Bottom housing member 81 has a planar mating surface 79 and four corner through holes 80. Threaded bolts (not shown) are inserted into aligned holes 53, 65, 80 to secure housing members 61, 81 to one another.

Figure 13:
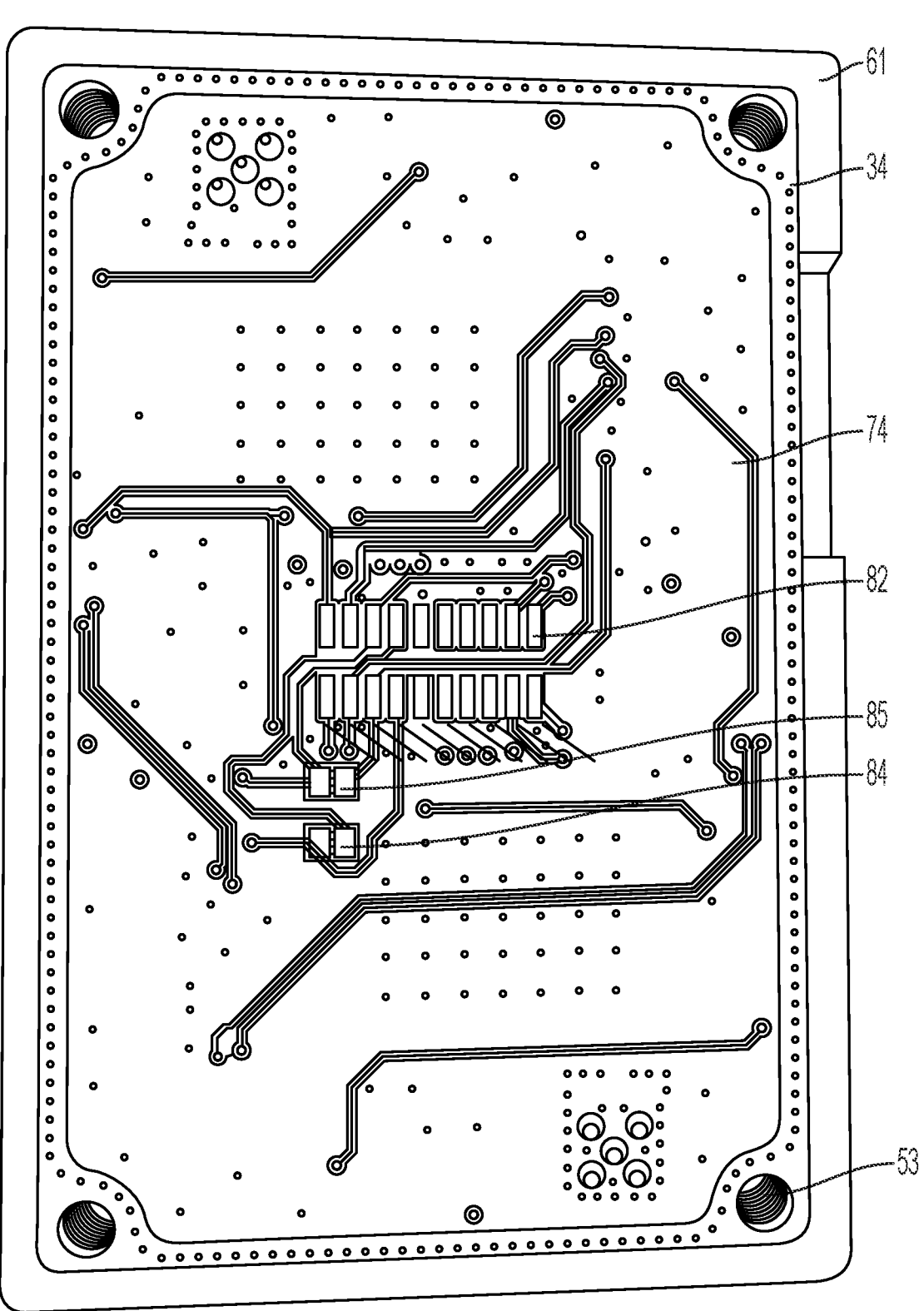
FIG. 13 is a perspective view of the bottom side of a circuit board in an exemplary embodiment.

As shown in FIG. 13, bottom surface 74 of circuit board 34 has a plurality of conductor pads 82 for access to a number of signal and voltage pins of GNSS receivers 11, 12. Connector 66 (FIG. 7B) may be soldered to pads 82, in an embodiment where, for example, a mating connector (not shown) may be secured to connector 66 to provide exterior access to pins of GNSS receivers 11, 12. A first jumper 84 is provided as a set of two pads—for the UART transmit pin of GNSS receiver 11 and the UART receive pin of GNSS receiver 12. A second jumper 85 is provided as a set of two pads—for the UART transmit pin of GNSS receiver 12 and the UART receive pin of GNSS receiver 11. Collectively, jumpers 84, 85 constitute connection 31 shown in FIG. 1. In an exemplary embodiment, electrically connecting only the two pads of jumper 84 effects a configuration where GNSS receiver 11 acts as a host and GNSS receiver 12 acts as a rover. Conversely, electrically connecting only the two pads of jumper 85 effects a configuration where GNSS receiver 12 acts as a host and GNSS receiver 11 acts as a rover. When both jumpers 84, 85 are engaged, bilateral UART communication between GNSS receivers 11, 12 is enabled whereby, for example, roles of host and rover may be interchanged according to situational dynamics, such as when a received signal metric for a GPS signal indicates that one of the receivers' GPS signals has a higher confidence level. Such may occur when a time delay for a GPS signal is caused by an obstacle that deflects the GPS signal or when a GPS signal encounters noise.

In operation, an embodiment of GNSS receivers 11, 12 may include a number of circuits and firmware/software programs configured to determine and correct heading information for drone 2. Receivers 11, 12 receive GNSS measurements from satellites and, for example, may each use conventional least-squares algorithms to derive an initial guess of a float solution for measurements, such as at a data frequency of at least 1 to 6 Hz. In providing at least semi-automatic heading control, and information support for various drone control systems, receivers 11, 12 may each provide any of a number of fields in various communications protocols and data formats. For example most protocols allow string and/or specifically-sized messages to communicate information fields such as current coordinate, heading, velocity estimates, and many others. Information such as Horizontal Dilution Of Precision (HDOP), horizontal Accuracy estimate (hAcc), NAVigation STATus (navStat), longitude (LON), latitude (LAT), and many other fields may be exchanged for achieving extremely precise dynamic heading determination, and associated confidence levels. Invalid data is automatically prevented from being output by receivers 11, 12. For example, a portion of an output data message may contain both valid time data as well as empty fields for, e.g., invalid position data. Position fix flags, such as for dead reckoning, GNSS fix, etc., may be set according to a protocol being implemented. Course and speed information may also be output/exchanged. Messages may have a scale factor defined for units such as centimeters, have a fixed-point integer value, and be applied to a floating-point number. Arrays of values may be defined, referenced, and identified for messages being sent back and forth, between receivers 11, 12, and between receivers 11, 12 and controller 23. Similarly, groups of fields may be defined, repeated, and referenced. Relative Positioning information (e.g., NAV-RELPOSNED, in a Neighborhood information Elements Discovery, or NED, protocol), axis shift (i.e., X, Y, or Z), rotation about an axis (e.g., (rotZ) in milli-arc seconds), and other data may be output/exchanged for determining heading. Ambiguities and errors may be identified and resolved according to known processes, and various masks may be utilized for filtering error correction processing and evaluation.

GNSS receivers 11, 12 and controller 23 may utilize a recursive statistical estimator such as a Kalman filter, an adaptive filter, a complementary filter, and/or an extended Kalman filter. Such may be adapted for generating many types of positional data including heading information. Kalman filtering may utilize information from sensors 28, such as environmental data and/or IMU data, in algorithms for assisted flight control. Examples of uses of Kalman filters, applicable to the present invention, are disclosed in US Patent Publications 20150097724, 20190280674, and 2019979, the teachings of which are incorporated herein in their entirety.

A dedicated "heading only" configuration is described for an embodiment where a user flies a drone using remote control device 18 in a cleaning operation, while dual GPS module 30 provides continuous, real-time, precise heading data and correction pertaining thereto. Besides using high resolution GPS heading information at a high update rate (e.g., 30 Hz), drone 2 may be configured to not otherwise use GPS data, and may be operated by user remote control with automated flight assistance such as collision avoidance, hover control, return to base, and sensor-assisted flight control. Such may utilize RTK, where the range, from a receiver 11, 12 to a GPS satellite, is determined using the GPS signal's carrier wave. Either receiver 11 or 12 may act as the RTK host, which determines and transmits the GPS correction factor, or as the rover, which receives the correction data and adjusts its real-time heading determination accordingly. By alternating the roles of host and rover, calibrations and reduction of ambiguities are further improved, and accuracy of heading determination is increased. When providing heading information is a primary function of GPS system 1 having dual GPS module 30 and having antennas 4, 5 disposed at a fixed distance D from one another, it is preferable to maximize the distance D between antennas 4, 5, while avoiding the possibility of electrical interference caused by motors 10.

In an embodiment, antennas 4, 5 are positioned so that the distance d therebetween is approximately 2.0 meters. For a correction rate of 5 updates per second, performance metrics include achieving heading accuracy (Root Mean Square-RMS) within 0.01071977328 rads. Horizontal accuracy (RMS) is typically within 0.2041334583 meters. Horizontal accuracy (RMS) is typically within 0.3755056809 meters. Accuracy may be improved when drone 2 is stationary. In flight, for a configuration with antennas 4, 5 flipped upside down, where vibration is greatly reduced, pitch and roll accuracy is also improved.

Embodiments may perform functions including providing interferometric heading information based on the path difference of respective signals received by receivers 11, 12, where the difference is presented as a phase difference (carrier phase differencing) creating an interference pattern between initially identical waves, the phase difference being diagnostic of obstacles and/or changes in the refractive index along the path. Other embodiments may disregard phase information and assume that two sets of received GPS signals are utilized only for relative heading determination.

Various sensors 28 may be incorporated in drone 2. At least one Inertial Measurement Unit (IMU) (not shown) may be utilized in drone 2. An IMU works by detecting linear acceleration using one or more accelerometers and by detecting rotational rate using one or more gyroscopes. Typically, an IMU provides three-dimensional positioning information. Ancillary equipment and functionality may include software and other sensors for determining a large number of parameters and data used for drone flight. Such may be integrated with data from dual GPS module 30. For example, primary GNSS information associated with Cartesian velocity vector projections may be incorporated into flight control patterns.

In an embodiment, a radar system 26, in communication with controller 23, is utilized for crash prevention. For example, radar system 26 may include a millimeter wave type radar module in communication with a detector 27, such as a planer antenna mounted to face in a forward flight direction of drone 2 to perform left to right scanning. Radar system 26 may utilize a variety of modulation methods, such as a frequency-modulated continuous waves (FM-CW) method that enables simultaneous measurement of both distance and range rate, and provision of angle information to detect the positions of obstacles. Typical horizontal detecting angles may be +/−20 degrees, so it is important that radar detector XX be positioned to accurately face forward, such as in an environment where drone 2 may fly in close proximity to a structure to be cleaned. Should the user, flying drone 2 by remote control, accidentally attempt to fly drone 2 into a structure, controller 23 reverts to a collision avoidance flight control operation. For example, as controller 23 monitors speed, trajectory, camera information, sensors 28, GPS, and radar system 26 signals, an indication of an impending collision triggers flight controls that immediately stop or reverse drone motion. Since drone 2 is typically flown in a forward direction, an automated radar-based response may include rotating drone 2 to face toward an unobstructed path.

In an embodiment, Wide Area Network (WAN) and cellular applications may be employed for flight logging, video monitoring and recording, and other uses. Drone 2 may include a cellular transceiver 29 in communication with controller 23. A cellular antenna 32 is typically an integral part of transceiver 29, but may alternatively be an external device. Antenna 32 is preferably positioned so its radiation pattern extends from the bottom of drone 2. Cellular functions may be ancillary, such as for user monitoring of flight data in real time, collecting log files, watching live video feeds, checking for and/or implementing software updates, etc.

Autonomous operation is desirable for commercial drone applications. Drones may operate in various swarm configurations that coordinate operations for a number of drones performing a commercial task. In an embodiment, drone 2 has a wireless transceiver 33 for two-way communications between controller 23 and remote control device 18 that allow a user to fly drone 2 while watching video from cameras 22 on screen 21. Any flight functions or ancillary functions of drone 2 may be automated, including, but not limited to, maintaining a specified or calculated distance away from a structure being cleaned, adjusting a distance away from an object based on information from sensors 28 and/or radar 26, returning to base, proceeding to a next auxiliary task, flying according to a task manager, flying according to automated processing of camera image data, adjusting flight parameters and/or flight instructions based on artificial intelligence (AI) programs, adjusting flight control based on heading information received from module 30, overriding user controls being sent from remote control device 18, and others. Module 30 provides accurate heading data to controller 23 which combines such data with IMU data using a Kalman filter. Latency is minimized because tuned antenna circuits 35, 36 minimize propagation time of GNSS data from antennas 4, 5 to receivers 11, 12, where processing time is minimized because of singularity of purpose and direct UART connection between receivers, and because the update rate of GNSS data is maintained at a highest rate, for example up to 20-30 Hz or more. Receivers 11, 12 achieve the highest update rate by disabling unused interfaces, by disabling unnecessary messages (such as by removing GNSS Sattellites in View (GSV) messages to reduce information throughput so buffers can handle incoming information), by turning off unused functions (for example sensor fusion), by setting baud rate at 115,200 to 230,400 or greater, by adjusting CFG_RATE settings for MEAS, NAV, PRIO and implementing Kalman filtering, by turning off all receiver functions except those used for heading determination, and others.

Although a "drone" is described herein as an aerial apparatus, a drone, generally, is a robot that may be adapted for use in the air, underwater or in subterranean environments. A drone has a motive system operable to controllably move the drone, and a control circuit that includes a computer, processor, memory, and input/output device, etc., and that operates using a large number of algorithms and instructions. The control circuit may communicate with any of the drone components, at least by obtaining sensor data. The control circuit processes data, controls operation of the drone, and may communicate with a remote controller via a wireless system such as a radio frequency (RF) system. A remote controller typically has a video display and is operated by a person who flies the drone by watching the video display, which displays images sent from the drone camera, and by manipulating control devices such as one or more joysticks and buttons, which causes the remote controller to send commands to the control circuit of the drone. The commands, for example, cause the control circuit to controllably operate motors, camera(s), and other drone equipment. Various commands may cause the drone to fly left, right, forward, backward, up, down, and/or roll, tilt, adjust yaw angle, etc. The control circuit may move or activate the camera(s), and may control any drone activity including operation of an ancillary device attached to the drone. For example, a drone may be equipped for various commercial uses, such as package delivery, spraying disinfectant or other chemicals, painting, etc.

Implementation of the described embodiments provides improved performance by eliminating conventional noise and interference problems and provides improved heading determination by reducing latency effects.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A drone comprising:
a drone center housing, a drone top and a drone bottom;
a plurality of arms each extending from the drone center housing, with each arm of the plurality of arms having a motor/propeller set disposed at an arm distal end located opposite the drone center housing;
a first antenna and a second antenna wherein the first antenna is mounted to a first arm distal end of a first arm of the plurality of arms opposite a first motor/propeller set mounted at the first arm distal end of the first arm and the second antenna is mounted to a second arm distal end of a second arm of the plurality of arms opposite a second motor/propeller set mounted at the second arm distal end;
with the first antenna and the second antenna located equidistant from the drone center housing and an angle formed by a first imaginary line from the drone center housing to the first antenna and a second imaginary line from the drone center housing to the second antenna is approximately 180 degrees; wherein all the arms of the plurality of arms, except that the first arm and the second arm, are oriented so that the motor/propeller set are on top of each arm relative to the drone bottom.

2. A drone comprising:
a drone center housing, a drone top and a drone bottom;
a plurality of arms each extending from the drone center housing, with each arm of the plurality of arms having a motor/propeller set disposed at an arm distal end located opposite the drone center housing;
a first antenna and a second antenna;
a circuit board having a circuit board top side opposite a circuit board bottom side, a circuit board first end, and a circuit board second end opposite the circuit board first end;
a first Global Navigation Satellite System (GNSS) receiver, a second GNSS receiver, a data communication connection between the first GNSS receiver and the second GNSS receiver, a first antenna connector, second antenna connector,
wherein the first antenna connector is proximate the circuit board first end, and the second antenna connector is proximate the circuit board second end;
wherein the first antenna is connected to the first antenna connector and the second antenna is connected to the second antenna connector;
wherein the first antenna is mounted to a first arm distal end of a first arm of the plurality of arms opposite a first motor/propeller set mounted at the first arm distal end of the first arm and the second antenna is mounted to a second arm distal end of a second arm of the plurality of arms opposite a second motor/propeller set mounted at the second arm distal end with the first antenna and the second antenna located equidistant from the drone center housing and an angle formed by a first imaginary line from the drone center housing to the first antenna and a second imaginary line from the drone center housing to the second antenna is approximately 180 degrees wherein the first motor/propeller set and the second motor/propeller set are oriented towards the drone bottom so that the first arm is above the first motor/propeller set relative to the drone bottom and the second arm is above the second motor/propeller set relative to the drone bottom;

and wherein all the arms of the plurality of arms, except that the first arm and the second arm, are oriented so that the motor/propeller set are on top of each arm relative to the drone bottom.

3. The drone of claim 2, further comprising a shield enclosure that electrically shields the circuit board.

\* \* \* \* \*